United States Patent [19]
Gorenschek

[11] 3,835,621
[45] Sept. 17, 1974

[54] SADDLE CONSTRUCTION, SEAT MEMBER FOR USE THEREIN, AND METHOD

[76] Inventor: Matthias Gorenschek, 2784 Foothill Rd., Santa Barbara, Calif. 93105

[22] Filed: Aug. 14, 1972

[21] Appl. No.: 280,191

[52] U.S. Cl. .................................................. 54/44
[51] Int. Cl. ........................................... B68c 01/02
[58] Field of Search............................ 54/44, 45, 46

[56] References Cited
UNITED STATES PATENTS

| | | | |
|---|---|---|---|
| 2,353,622 | 7/1944 | Boyle...................................... | 54/44 |
| 3,286,440 | 11/1966 | Walker et al. ........................... | 54/44 |
| 3,312,040 | 4/1967 | Nuzzo..................................... | 54/44 |
| 3,323,286 | 6/1967 | Lavrin, Jr. ............................... | 54/44 |

*Primary Examiner*—Hugh R. Chamblee
*Attorney, Agent, or Firm*—Flehr, Hohbach, Test, Albritton & Herbert

[57] ABSTRACT

A saddle with a flexible saddletree contained therein having a sheet-like seat member and having resilient padding on the underside allowing a continuous conforming fit to the back of a horse as the back of the horse changes shape due to muscle movement while the horse is in motion. The saddle has a pommel-like member in the forward portion and the rear of the seat is moved forward to provide a straight line dimension from the rear of the seat to the lower rear of the pommel-like member in the range of 8 to 14 inches. The forward portion of the seat is generally at the level of the seat, and in no event more than 1 ½ inches above the seat level. The shortening of the seat places a rider forward and the lowering of the forward portion of the seat removes the tendency for the rider to slide backward. The rider position is stabilized over the horse's withers without the necessity for an upper chest strap and the rider is placed in a position of minimum vertical motion when the horse is in motion.

10 Claims, 11 Drawing Figures

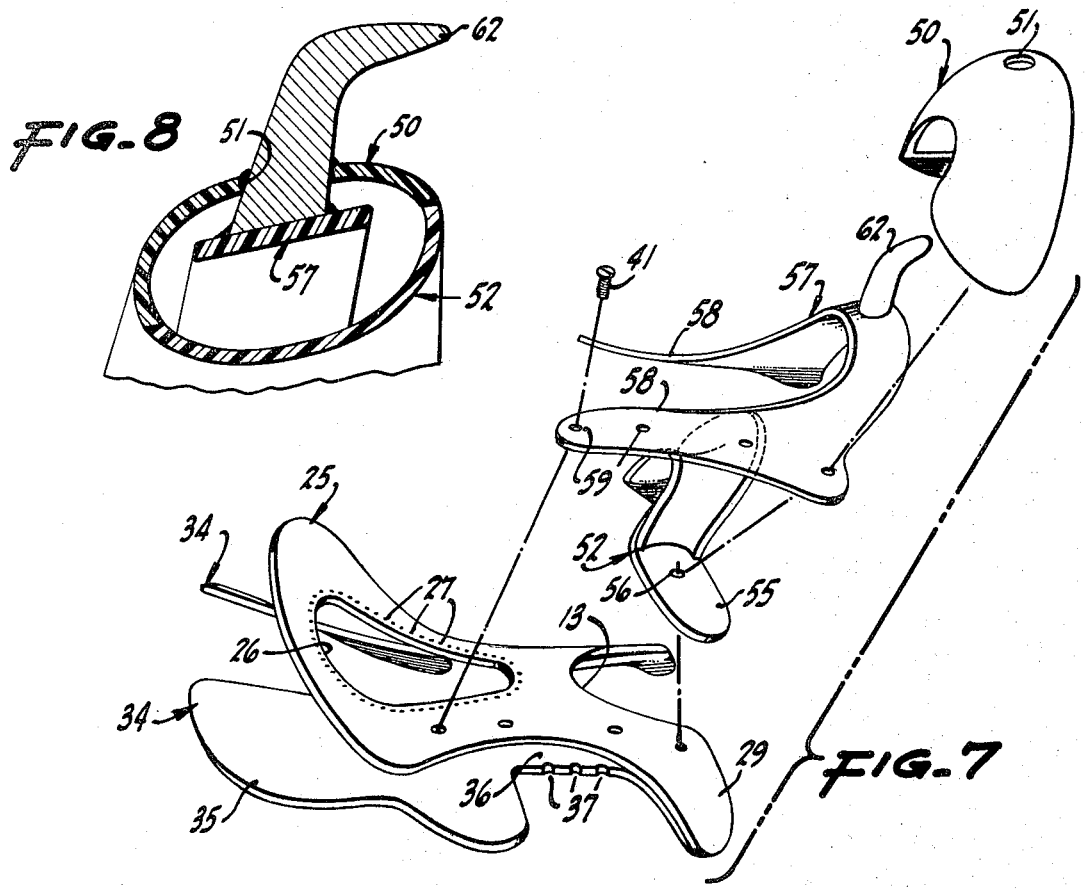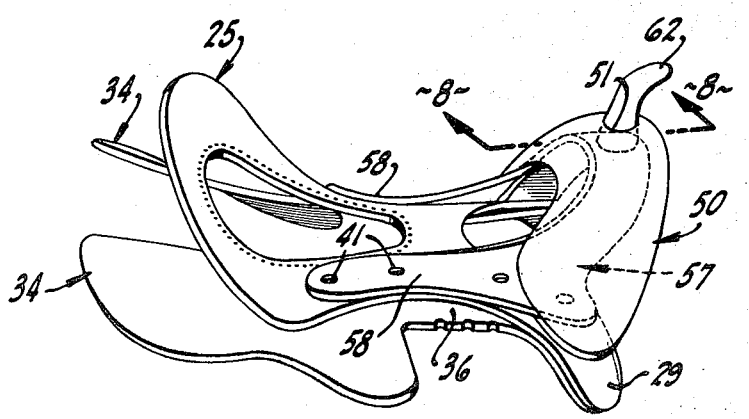

SADDLE CONSTRUCTION, SEAT MEMBER FOR USE THEREIN, AND METHOD

BACKGROUND OF THE INVENTION

The invention disclosed herein is relative to saddles for use in supporting riders on the back of a horse. More particularly a new design in a saddle is presented which possesses the capability of providing a more comfortable ride for both horse and rider and reducing fatigue fracture in the contained saddletree.

Saddletrees in the past have been of rigid construction. Western saddletrees are generally fabricated of wood and have a high forward seat area generally termed a pommel area carrying a pommel swell mounting a saddle horn which may be used for working cattle with a rope and a cow pony. English saddles, generally used by polo players and other riders engaging in horseback sports, have saddle trees made of iron and wood combinations having a pommel area considerably displaced above the horse's back and the lower level of the saddle seat. Generally webbing of some durable fabric is run from the high point of the pommel area to the rear of the saddle seat. The raised pommel area in both the Western and English type saddles necessitates a seat of extra length to allow the rider to slip back into the cup portion of the seat just ahead of the cantle or the raised rear portion of the seat. There is a tendency then for the rider to be generally urged toward the rear of the saddle. This tends to urge the entire saddle and rider combination rearward toward the horse's kidneys.

To counteract the rearward motion tendency a strap is generally fastened from the saddle around the upper portion of the horse's chest forward of the front legs. There remains some motion rearward since the chest strap cannot be cinched too tightly. The rigid saddletree seldom affords a closely conforming fit between the saddle underside and the horse's back. This is especially true when the horse is in motion and the muscles along the back are in motion beneath the saddle. Even considerable padding on the underside of the saddle will not alleviate the stress experienced by the rigid saddletree and frequently fracture of the saddletree occurs in the pommel and sidebar areas requiring extensive saddle repairs. Prior art has established the fabrication of a saddletree using fiberglass cloth and resin. U.S. Pat. No. 3,293,828 issued to A. Hessler disclosed a Western saddletree of precisely the same shape as a wooden Western saddletree. It is of hollow construction and affords a weight saving over the prior wooden saddletree, but due to its construction possesses the same rigidity as the wooden version. The disadvantages seen in the old type wooden saddletree, a high pommel area urging a rider rearward, rigidity within the saddletree, a long saddle seat, and an ill fit between the saddle underside and the horse's back all remain in the disclosure covered by the aforementioned patent.

The jockey saddle is the only rider support which properly positions the rider forward over the horse's withers providing the most efficient ride. Such a saddle is not made to afford seat contact while riding as the jockey's weight is supported entirely in the stirrups. It can be seen that there is a need for a simplified, light weight construction, flexible saddletree which will afford a riding saddle constructed to place a rider in a forward position of minimum motion on the horse's back and where the horse in turn will exhibit the greatest tolerance for carrying the rider.

SUMMARY AND OBJECTS OF THE INVENTION

The saddle construction, seat member and method disclosed herein relates to a saddle containing a light flexible saddletree and having a sheet-like seat member formed of a flexible material. The seat member has a forward extending frontal portion generally at the same level as the seat portion and in no event at a level more than one and a half inches above the seat portion. Resilient means underlying the seat member, comprised of resilient underlying saddletree members and padding, adapt to the shape of the horse's back while the horse is in motion or at rest. Means are provided for securing the seat member and the means underlying the seat member into a unitary assembly, as are means designed to affix the saddle firmly to the horse's back. The unitary assembly is covered with appropriate leathers and durable fabric and stirrup means are provided for engagement by the feet of the rider in the saddle.

In general it is an object of the present invention to provide a saddle construction and seat member which is flexible and which will fit the back of any horse.

Another object of the present invention is to provide a method for construction of a saddle and a seat member contained therein which continuously conforms to the back of any horse at rest or in motion.

Another object of the present invention is to provide a saddle construction and seat member with a reduction in weight compared with conventional saddle construction.

Another object of the present invention is to provide a saddle construction and seat member which places the rider forward over the horse's withers inducing less fatigue in rider and horse.

Another object of the present invention is to provide a saddle construction and seat member which removes the necessity for an upper chest strap for holding the saddle forward on the horse's back.

Another object of the present invention is to provide a saddle construction and seat member which lowers the forward portion of the seat toward the lowest level of the seat, and to shorten the seat dimension from the rear of the seat to the forward portion of the seat to remove the tendency for the rider to drift rearward in the saddle on the horse's back.

Additional objects and features of the saddle construction and seat member will appear from the following description in which the preferred embodiments have been set forth in detail in conjunction with the accompanying drawings.

BRIEF DESCRIPTION OF THE DRAWINGS

FIG. 6 is a perspective view of a Western style saddletree in an assembled condition.

FIG. 7 is an exploded view of a Western style saddletree.

FIG. 8 is a cross sectional view taken along the line 8—8 of FIG. 6.

DESCRIPTION OF THE PREFERRED EMBODIMENTS

The saddle construction and method disclosed herein relates to the manufacture of an improved saddle for use on horseback and for the process involved in the manufacture. The saddle has a saddletree which is fabricated of fiberglass and resin in this embodiment. A material with similar flexible characteristics and demonstrating sufficient strength may be utilized as long as it fulfils the basic principle of the invention in conforming to the shape of the back of a living creature in motion. The saddle construction encompasses three preferred embodiments. The first embodiment is a new type of saddle. The second embodiment is similar to the Western type saddle construction which presents the standard Western pommel swell and horn but incorporates the advantages of the new type embodiment. The third embodiment is similar to the English saddle construction and utilizes a conventional English undersaddle, but takes advantage of the new type saddle seat thereby acquiring the advantages of the new type saddle construction.

The use of fiberglass in forming the various saddletree members has the advantage of requiring relatively simple forms and eliminates the need for complex and expensive molds. The method of forming is fast. The process requires laying down pieces of fiberglass cloth over the form, impregnating the cloth with a mixture of resin and catalyst, and covering the previous layer with another layer of fiberglass cloth. Resin impregnated fiberglass cloth layers are laid down to build up any desired thickness. There is no curing time required between the application of layers. Curing time on the form is approximately 1 day.

Figure 3:
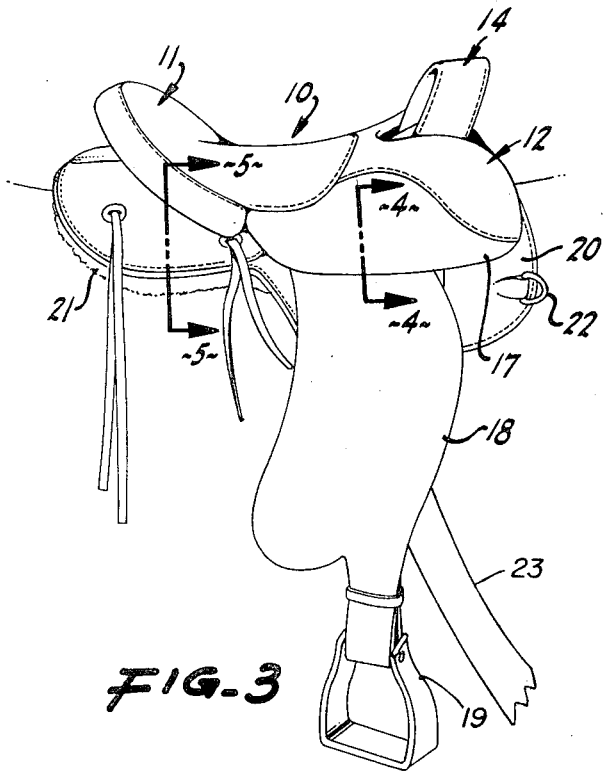
FIG. 3 is a perspective view of a complete saddle.

The embodiment of the new type saddle construction is shown in FIG. 3. The finished saddle is covered with leather in this instance and shows a seat area 10 the rear portion of which is raised, forming the cantle. The forward portion of the seat is termed the pommel area 12 and has a cut away portion 13 which is spanned by an expansion handle or pommel-like means 14. A sheet of leather depends from the side of the seat 10 forming the jockey 17. Fenders 18 supported internally of the saddle depend from each side thereof supporting the stirrups 19. Leather skirting 20 covers internal flexible support members on the top which are covered on the underside by a deep pile material 21 such as sheepskin. Rings 22 are afforded on the lower forward portion of the saddle to which a breast strap may be attached in the event one is necessary. Means secured to the saddle, such as straps 24 and saddle cinch 23 as seen in FIG. 2, is adapted to surround the lower chest of the horse at the rear of the front legs.

Figures 1, 2:
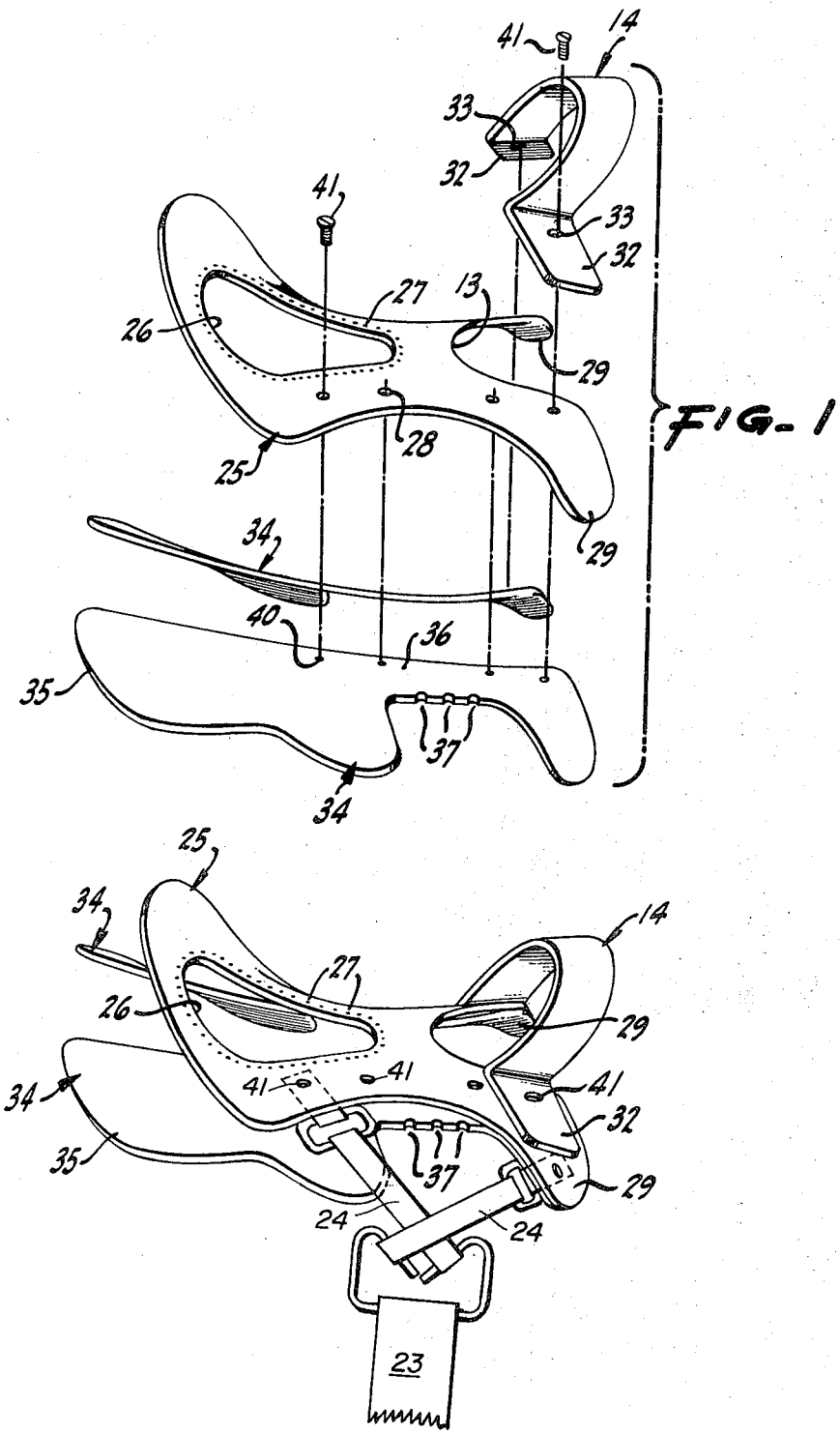
FIG. 1 is an exploded view of a saddletree utilized in the saddle construction incorporating the present invention.
FIG. 2 is a perspective view showing the saddletree in FIG. 1 in an assembled condition.

Referring to FIG. 1 an exploded view of the saddletree for the preferred embodiment is seen. A seat member 25 is provided with a central cut out portion 26 surrounded by a plurality of stitching holes 27. A pattern of four holes 28 is aligned on both the left and right sides of the seat member 25. Downward and forward extending members 29 are seen on the left and right sides of the seat member 25 affording flexible forward seat support. The cut away area 13 in the forward seat area, or pommel area, is clearly seen in the seat member 25. The pommel-like means 14 has left and right feet 32 having holes 33 therein. The feet 32 are adapted to fit over a portion of the forward extending members 29 and the holes 33 aligned with the forward hole in the pattern 28 on the seat member 25. Left and right sidebar members 34 have rearward extending portions 35 which afford flexible rear seat support. A narrow central portion 36 has internal reinforcement webbing (not shown) and a trio of notches 37 on the outside edge of the sidebar 34. Threaded members 40 are embedded in the sidebars 34. Screws 41 afford the means for securing the saddletree members together in a unitary assembly as they are inserted through the holes 33 and 28 engaging the threaded members 40 in the sidebars 34. In this embodiment the saddletree members are fabricated of fiberglass and resin and when firmly joined together provide the flexible saddletree seen in FIG. 2.

Figure 4A:
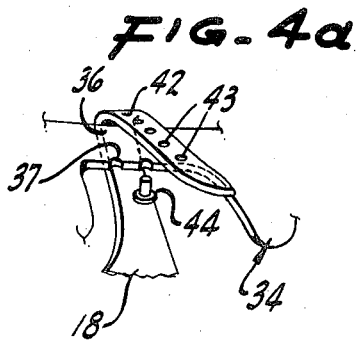
FIG. 4a is a perspective view of the section 4—4 of FIG. 3.
Figure 4:
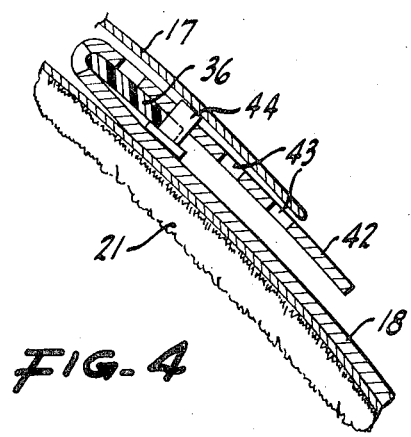
FIG. 4 is a cross sectional view taken along the line 4—4 of FIG. 3.

Fenders 18 are supported by the narrow central portion 36 of the sidebars 34 and have a strap like upper section 42 having holes 43 as seen in FIG. 4. Proper height for the stirrups 19 is adjusted by drawing the strap 42 around the sidebar central portion 36. Longitudinal positioning of the stirrups 19 is then selected by positioning pin 44 in one of the three notches 37 in the sidebar central portion 36 and inserting it in one of the holes 43 in strap 42.

Figure 5:
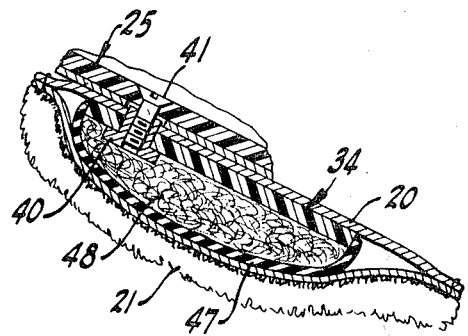
FIG. 5 is a cross sectional view taken along the line 5—5 of FIG. 3.
Figure 2A:
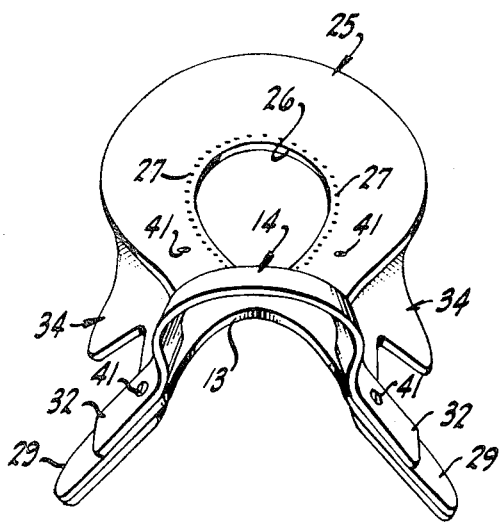
FIG. 2a is a perspective view of the assembled saddletree looking from the front and the top.

A pliable material such as leather is cut to the shape of the central cut-out 26 in the seat member 25. The pliable material is stitched into place in the cut-out 26 passing the stitching through the holes 27. Sidebars 34 have a top covering of leather represented by the skirting 20. Referring to FIG. 5 an elastic sheet 47 such as foam rubber is attached to the sidebar 34 and horse hair 48 is stuffed between the sidebar 34 and the sheet 47. A leather covering having the deep pile material 21 attached thereto joins the leather skirting 20 at the edges surrounding the sidebar 34 and capturing and supplementing the padding afforded by the horse hair 48 and the rubber sheet material 47. The remainder of the saddle is covered in a conventional manner with stitching, padding, and leather external covering to provide the finished saddle of the preferred embodiment seen in FIG. 3.

The physical characteristics of the Western style saddle construction disclosed herein are identical to those of the embodiment seen in FIG. 3 with the exception of the construction utilized in the pommel swell 49 as seen in FIG. 6. FIG. 7 shows an exploded view of the pommel swell 49 and its relation to the assembly of the seat member 25 and the sidebar members 34. The pommel swell 49 is formed of hollow construction, consisting of an upper shell 50 having a hole 51 centrally located therein. A lower shell 52 having left and right feet 55 has a hole 56 in each foot 55. An internal pommel member 57 has rearward extending portions 58 departing from the pommel swell 49 at the feet 55 and having a pattern of holes 59 therein. As is best seen in FIG. 8 a saddle horn 62 is mounted on the top of the internal pommel member 57 extending through the hole 51 where it is available for use as a stop for a rope when the saddle is used for working. Screws 41 provide means for fastening the saddletree members together in a unitary assembly passing through holes 59 and 28 to pick up the threaded members 40 in the sidebars 34 as before. A firmly joined flexible saddletree assembly for a Western style saddle results as is best seen in FIG. 6.

Figure 9:
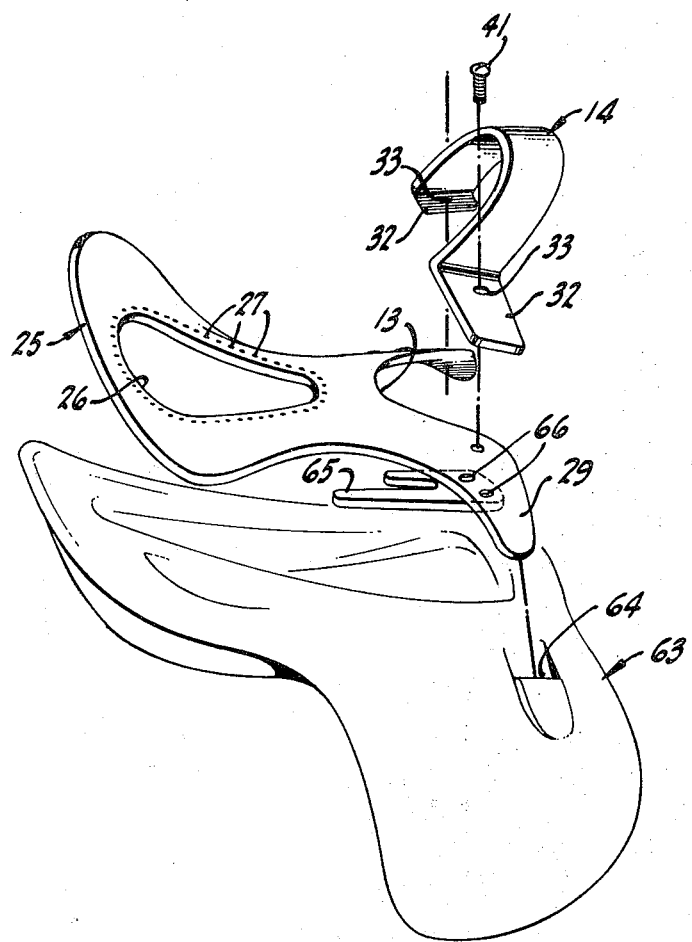
FIG. 9 is an exploded view of an English saddletree and undersaddle.

Referring now to FIG. 9 the saddle construction for the English saddle embodiment is shown. An English undersaddle 63 has pockets 64 located in the forward portion to receive the flexible forward extending members 29 of the seat member 25. Pommel-like means 14 is formed as before in the shape of an inverted U and attached to seat member 25 as before with screws 41. Metal stirrup hangers 65 are firmly attached to seat 25 by means of rivets 66. Seat 25 when covered with a durable fabric has stiff leather flaps (not shown) attached to the underside thereof which are stitched to the rear portion of undersaddle 63 securing the seat 25 at the rear.

Turning now to the process involved in the fabrication of the saddle construction, reference is made to the exploded view of the saddletree shown in FIG. 1. The pommel-like means 14, seat member 25, and sidebars 34 are all formed on reusable forms by laying fiberglass cloth over the forms, impregnating the cloth with fiberglass resin and catalyst, laying another layer of fiberglass cloth over the resin impregnated layer, and repeating the cloth-resin sequence until the desired thickness in the saddletree member is achieved. A thickness afforded by from 14 to 16 layers has been found to be satisfactory for most applications. The sidebars 34 have been found to perform in a most satisfactory manner with eight layers in the flexible rearward extending seat support areas 35 and with 16 layers in the central portions 36. Elsewhere the average thickness afforded by 14 to 16 layers is generally desirable. In custom cases where unusually light construction is warranted 12 layers are provided. In custom cases where unusually heavy construction is warranted 20 layers are used. Throughout the saddletree members the formed thickness varies from one-eighth inch which is equivalent to eight layers, to five-sixteenths inch which is equivalent to 20 layers.

The seat member 25 is finished by forming the pommel area cut out 13 and trimming the forward portion to form the left and right forward extending flexible seat supports 29.

The pommel area cut out 13, or forward seat area, allows the seat 25 to be shortened about 6 inches compared to existing saddles which have pommels built up well above the seat levels. This means that a straight line dimension from the raised rear portion of the seat 25 to the point on the seat where the rear portion of the flexible pommel member 14 attaches, varies from 8 to 14 inches.

The central cut-out 26 in the seat 25 is adapted to receive a pliable leather piece stitched in place utilizing holes 27 placed about the cut-out 26 for that purpose. The expansion handle 14 bridges the pommel area cutout 13 and when fastened to the seat 25 joins the flexible forward seat supports 29 affording additional saddletree support and flexibility. The sidebars 34 are formed with rearward extending flexible members 35 which, when fastened to the underside of seat 25, afford left and right rear seat supports. The front and rear flexible seat supports 29 and 35 comfortably configure the saddletree to conform to the shape of the back of any horse.

The central portion 36 of the sidebars 34 are reinforced with a sturdy webbing and built up with extra layers of resin and fiberglass cloth during the forming process providing extra strength for supporting the depending fenders 18 and attached stirrups 19. Notches 37 in the central portion 36 are formed to accept pins 44 for longitudinal adjustment of the stirrups 19. The pins 44 also fit through the holes 43 in the upper fender straps 42 for vertical adjustment of the stirrups 19.

Prior to assembly of the saddletree members the pommel-like means 14 and seat 25 are covered with appropriate leathers and padding by means of stitching the leathers thereabout. The sidebars 34 are covered with leather skirting 20 on top and elastic sheeting 47 is attached to the underside. The sheeting 47 is stuffed with horse hair 48 and covered with sheepskin 21. The sheepskin 21 and skirting 20 are stitched around the sidebars 34 with an opening at the central portion 36 to allow access for adjustment of the stirrups 19 as described above.

After being covered, the flexible saddletree members are formed into a unitary assembly by means of screws 21 passing through holes in the pommel-like means 14 and seat 25, and in their respective coverings, and engaging threaded members 40 embedded in the sidebars 34 during the formation thereof.

The resulting saddle provides a flexible shape continuously conforming to the undulating shape of the horse's back and stabilizing the rider over the horse's withers in a region of minimum vertical motion. The usual tendency for a rider and saddle to be urged rearward by the combined effects of a raised forward seat area or pommel area and a long seat is eliminated. The absence of this rearward motion tendency often removes the need for an upper chest strap, which is standard with the conventional saddle.

The functional characteristics of the Western and English saddle construction embodiments are as described above. The method of fabrication for the Western saddle embodiment involves substitution of the pommel swell 49 for the expansion handle 14. The method of fabrication for the English saddle embodiment is the same as for the new saddle embodiment except for the use of the undersaddle 63 in lieu of the sidebars 34 and the consequent need for installation of hangers 65 prior to covering the seat 25.

The saddle construction disclosed herein provides a flexible, form fitting saddle, with resilient underpadding. The saddle provides a short seat 25 positioning the rider forward toward the front or pommel area of the saddle in a position of minimum vertical motion over the horse's withers. Saddletree fracture is all but eliminated due to the flexibility of the saddletree disclosed as part of the saddle construction. The comfort and endurance capabilities of both rider and horse are enhanced by the manner in which the disclosed saddle functions due to its close conformity to the continuously changing shape of the horse's back while the horse is in motion. The improved saddle affords a weight saving of up to 50 percent compared to the old style Western saddle construction using a wooden saddletree. A weight saving of about 25 percent may be realized in the English saddle construction disclosed herein. The new design saddle construction has a maximum weight of about 16 lbs.

I claim:

1. In a saddle for a rider on a horse, a saddle tree including, a sheet-like seat member formed of a flexible material, said seat member having an upwardly inclined rearwardly cantle portion, said seat member having an intermediate seat portion having downwardly and outwardly sloping side portions and a forwardly extending frontal portion, said frontal portion being generally at the same level as the intermediate seat portion and in no event at a level greater than 1 ½ inches above the intermediate seat portion, so that the rider is maintained in a forward position in said seat member, flexible pommel-like means secured to said frontal portion of said seat member serving as a saddle bow and a carrying handle, means underlying said seat member adapted to engage the back of the horse, said means underlying the seat member flexibly adapting to the shape of the horse's back while the horse is in motion or at rest, means for covering and padding said seat member, pommel-like means, and means underlying said seat member, means securing said seat member and said means underlying the seat member into a unitary assembly, means secured to the unitary assembly adapted to surround the lower chest of the horse at the rear of the front legs whereby the saddle can be secured to the horse over the horse's withers, and stirrup means carried by the unitary assembly adapted to be engaged by the feat of the rider in the saddle.

2. A saddle as in claim 1 wherein said frontal portion of the seat member is provided with a centrally disposed cut out which opens through the front side of the seat member.

3. A saddle as in claim 1 wherein said seat member is formed with an opening extending through the rearwardly extending cantle portion and intermediate seat portion and wherein a pliable covering is carried by the seat member extending across said opening to close the opening.

4. A saddle as in claim 1 wherein said means underlying the seat is comprised of two separate spaced side bar members formed of a flexible material said side bar members generally conforming to the back of the horse, said side bar members being disposed on opposite sides of the seat member.

5. A saddle as in claim 1 wherein said pommel-like means is in the form of a strip of resin reinforced fiberglass having a generally U-shaped configuration.

6. A saddle as in claim 1 wherein said seat member is provided with downwardly and forwardly extending spaced apart portions.

7. A saddle as in claim 6 wherein said means underlying said seat member is provided with downwardly and forwardly extending portions which conform to the configuration of the downwardly and forwardly extending portions provided on said seat member and wherein said downwardly and forwardly extending portions are positioned adjacent to each other.

8. A saddle as in claim 1 wherein the straight line distance between the top of said cantle portion and the lower rear of said pommel means ranges from 8 to 14 inches.

9. A saddle as in claim 13 wherein said dimension is approximately 10 inches.

10. In a saddle for a rider on a horse, a sheet-like seat member formed of a flexible material, said seat member having an upwardly inclined rearwardly cantle portion, an intermediate seat portion having downwardly and outwardly sloping side portions and a forwardly extending frontal portion, said frontal portion being generally at the same level as the seat portion and at no event at a level greater than 1 ½ inches above the seat portion, so that the rider is maintained in a forward position in said seat member, flexible pommel-like means secured to said frontal portion of said seat member serving as a saddle bow and a carrying handle, two separate spaced side bar members underlying said seat member formed of a flexible material, said side bar members being disposed on opposite sides of the seat members and flexibly adapting to the shape of the horse's back while the horse is in motion and at rest, means securing the said seat member and said two separate spaced side bar members to a unitary assembly, means secured to the unitary assembly adapted to surround the lower chest of the horse at the rear of the front legs whereby the saddle can be secured to the horse over the horse's withers, said seat member and said bar members being formed of a resin reinforced fiberglass having a thickness ranging from one-eighth inch to five-sixteenths inch and stirrup means carried by the unitary assembly adapted to be ingaged by the feet of the rider in the saddle.

* * * * *